Figure 2:
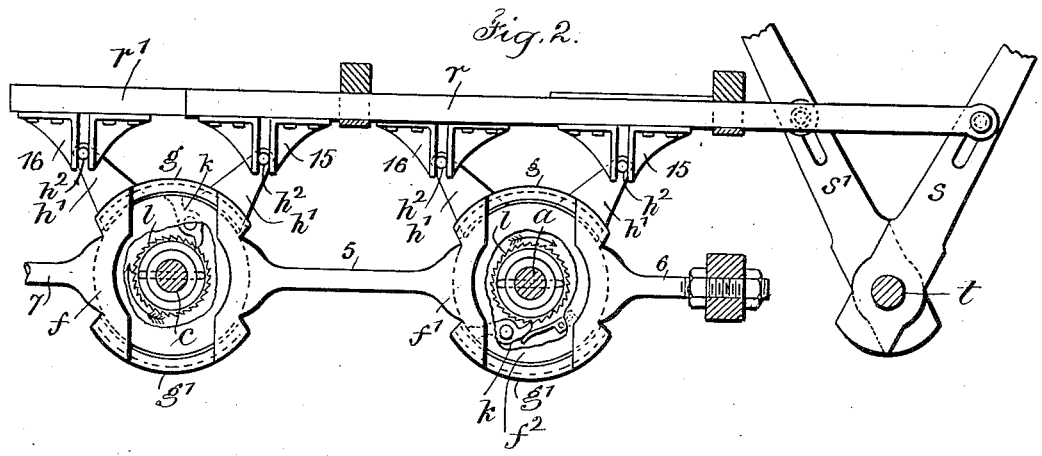

No. 879,710. PATENTED FEB. 18, 1908.
J. A. WILKIN.
CHANGEABLE SPEED DEVICE.
APPLICATION FILED MAY 18, 1907.

3 SHEETS—SHEET 1.

Witnesses
Chas H Smith
A. H. Sewell

Inventor
Joseph A. Wilkin
per Harold Serrell
his atty

No. 879,710. PATENTED FEB. 18, 1908.
J. A. WILKIN.
CHANGEABLE SPEED DEVICE.
APPLICATION FILED MAY 18, 1907.

3 SHEETS—SHEET 2.

Witnesses
Chas. H. Smith
A. L. Serrell

Inventor
Joseph A. Wilkin
per Harold Serrell
his atty

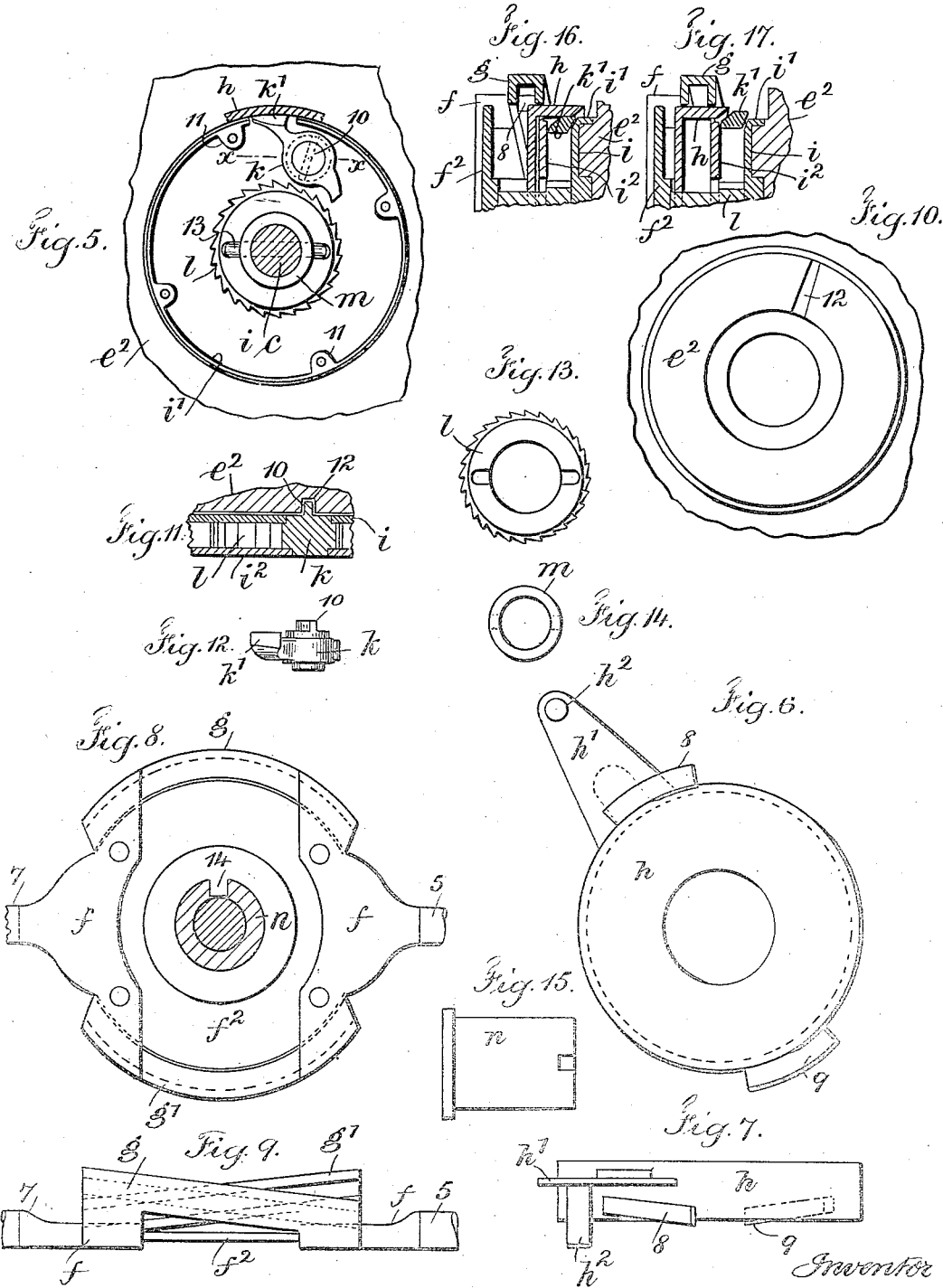

UNITED STATES PATENT OFFICE.

JOSEPH A. WILKIN, OF MATAMORAS, PENNSYLVANIA.

CHANGEABLE-SPEED DEVICE.

No. 879,710.  Specification of Letters Patent.  Patented Feb. 18, 1908.

Application filed May 18, 1907. Serial No. 374,393.

*To all whom it may concern:*

Be it known that I, JOSEPH A. WILKIN, a citizen of the United States, residing at Matamoras, in the county of Pike and State of Pennsylvania, have invented an Improvement in Changeable-Speed Devices, of which the following is a specification.

My invention relates to devices for changing the speed of a rotating driven member or axle, to dis-connect the same so as to run free and for reversing the same, and my invention is applicable to almost any form of machinery where these conditions are desired.

My invention is however especially adapted for use in motor vehicles and motor boats and in the device of my invention I employ a power shaft, an axle or driven member and an intermediate shaft. The intermediate shaft and axle or driven member are coupled together by sprockets and a chain or other suitable means and remain so regardless of the connection or dis-connection of the other parts of the device.

In the device of my improvement the power shaft and the intermediate shaft are connected by suitable devices such as graduated sprockets or pulleys and chains or bands in series or progressively increasing sizes to suit the various desired differences in the power applied and the speed.

The sprockets or pulleys upon the intermediate shaft are all loosely placed and I prefer also to loosely place those upon the power shaft and each loose sprocket wherever located is provided with a clutch device and means for actuating the same. Each clutch device comprises a disk carrying a pawl and engaging a sprocket and a ratchet secured to the shaft to be engaged by the pawl so that the power and rotation of the shaft is communicated through the ratchet and pawl and disk to the sprocket or vice versa. A disk member loose upon the shaft is also a part of the clutch device and it carries a crank and crank pin and upon its periphery are oppositely placed lugs. A frame of circular form concentric with the said disk carries opposite spirally arranged grooves receiving said lugs and said frame is suitably supported by a bracing device or series of rods whose ends are suitably secured to the frame of the mechanism, motor vehicle or motor boat. The crank pin of said crank is received in a slot between bracketed members secured to a longitudinally movable shift bar or rod which is actuated by a lever. This lever is manually actuated to clutch or un-clutch the pawl and each series of sprockets and chains or band wheels is provided with a similar and independently actuated lever and clutch device for engaging the pawl. Each pawl has a prolongation in the form of a lever projecting through an opening in the clutch box periphery adjacent to the rim of the disk member and as this disk member is turned by its crank it is moved lengthwise of the intermediate shaft by the action of its lugs in the spiral grooves of the frame; this movement causing the rim of the disk member to override the lever or projecting end of the pawl to move and disengage the pawl from the ratchet, and in the reversed direction this device moves back out of the way to permit the lever end of the pawl to project and the pawl point to engage the ratchet. These clutch parts are duplicated with each loose sprocket or band-wheel and where both the power shaft and the intermediate shaft are provided with companion series of loose sprockets the cranks of each pair are simultaneously engaged and operated by a common shift bar and manually actuated lever.

In the drawings I have shown the devices of my improvement as separate and distinct from any particular mechanism, motor vehicle or motor boat with which they may be connected, and only associated with a power shaft, a driven shaft or axle and an intermediate shaft.

Figure 1:
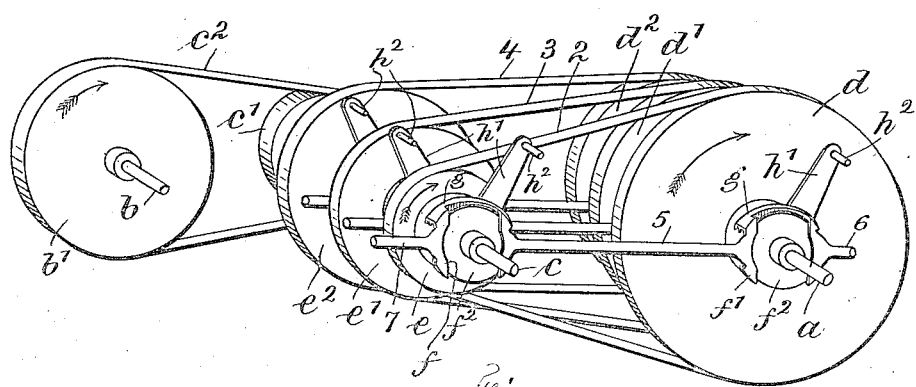
Figure 18:
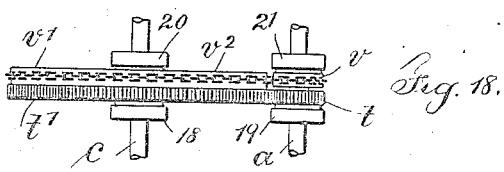
Figure 3:
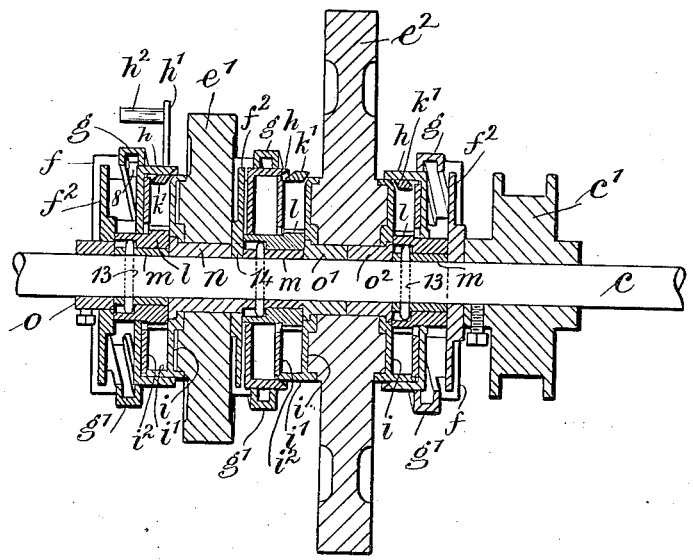
Figure 4:
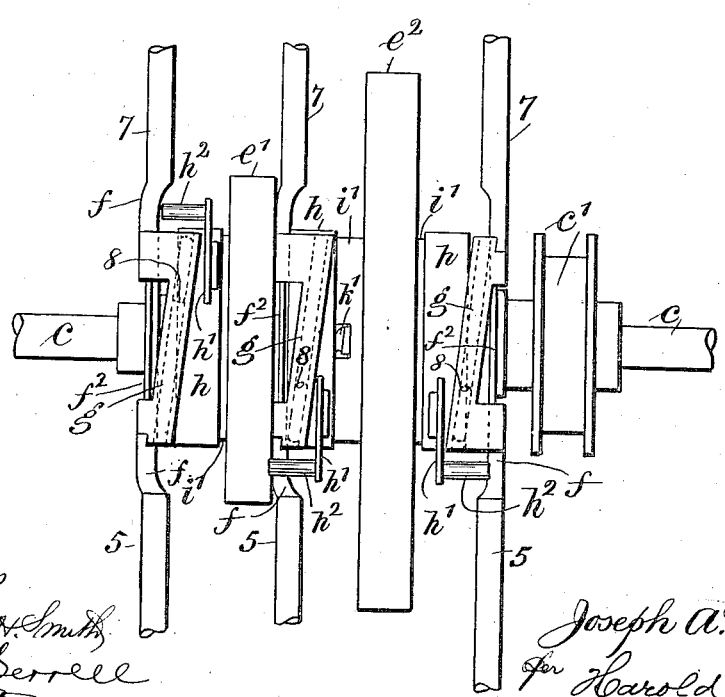

In these drawings, Figure 1 is a perspective view generally representing the three shafts and the devices of my improvement. Fig. 2 is a side elevation of the devices shown in Fig. 1 except the pulleys or sprockets and their chains or bands. In this figure I have shown the shift bars and their actuating levers and parts of the device broken open so as to illustrate the pawl and ratchet device within. Fig. 3 is a vertical section and partial elevation along the line of the intermediate shaft. Fig. 4 is a plan of the parts shown in Fig. 3. Fig. 5 is an elevation of part of the sprocket together with the flanged disk next thereto and in which figure I have shown also the pawl and ratchet. Fig. 6 is an elevation and Fig. 7 a plan of the flanged disk member, its crank and the lugs carried thereby. Fig. 8 is an elevation and Fig. 9 a plan of the concentric frame and its supporting bars. Fig. 10 is an elevation at one side of a sprocket showing the construction thereof with special reference to the pawl device. Fig. 11 is a sectional plan on the dotted line $x, x$, of Fig. 5. Fig. 12 is a plan of the pawl device. Fig. 13 is an elevation of the ratchet, Fig. 14 an elevation of the sleeve within the ratchet, Fig. 15 an elevation of a sleeve around the axle and hereinafter described, Figs. 16 and 17 are cross sections of the frame, flanged disk and pawl case devices similar to the parts in Fig. 3 but of larger size, and Fig. 18 is a plan of a modification.

Referring particularly to Fig. 1, $a$ represents the power shaft, $b$ the driven shaft and $c$ the intermediate shaft. For these shafts suitable end bearings are to be provided for mounting the same according to the devices with which this apparatus is employed.

On the intermediate shaft $c$ is a pulley or sprocket, $c^1$ and on the driven shaft $b$ is a pulley or sprocket $b^1$; the chain or band $c^2$ passing around $c^1$ and $b^1$ to connect the same so that the power and rotation of the intermediate shaft $c$ is communicated to the driven shaft $b$.

I have shown upon the power shaft $a$ a series of pulleys or sprockets $d\ d^1\ d^2$ and upon the intermediate shaft $c$ a series of pulleys or sprockets $e\ e^1\ e^2$ and bands or chains 2 3 4 passing around these several pulleys or sprockets for connecting the same and for transmitting the power and rotation of the shaft $a$ to the shaft $c$. These series of pulleys or sprockets are shown as of different sizes. The question of their size bears no relation to the essential features of my invention as they are to be regulated at will according to the differences in speed to be imparted to the intermediate shaft.

The series of pulleys or sprockets on the power shaft $a$ may be fastened thereto, and each of the series of pulleys or sprockets on the intermediate shaft are provided with a clutch to connect them at will to the shaft, otherwise they will be free from the rotation of the shaft.

The series of pulleys or sprockets on the power shaft may if desired be made in a similar manner as those on the intermediate shaft, that is, each provided with a clutch so that unless the clutch is in engagement the pulley or sprocket is free from the shaft.

Each clutch device in the structure of my improvement is made the same and except for a few minor details the description of one will answer for all.

As shown in Figs. 1 and 2, the series of pulleys or sprockets on the power and intermediate shafts are provided with clutch devices and concentric supporting frames: $f\ f^1$ show these frames concentric with these axles connected together by a bar 5 and having end bars 6 7 extending to suitable points of support where they are fastened in the mechanism or in the frame of the motor vehicle or motor boat. $f^2$ is an apertured face plate secured to or formed integral with the said frames. Each of these frames has a corresponding construction.

Each frame is provided upon opposite sides with spiral groove cases $g\ g^1$ which are substantial parts of the frame connecting the said members together and these frames receive the flanged disk member $h$ and the spiral groove cases receive the lugs 8 9 upon opposite sides of the said flanged disk member. Each disk member is provided with a crank $h^1$ and crank pin $h^2$; the positions of these cranks and pins being illustrated in the perspective view Fig. 1. The turning of the disk member by its crank and pin from one of these positions to the other and by virtue of the lugs in the spiral groove cases, a back and forth motion along the shaft is thus provided shifting the position of the said flanged disk member.

I provide against one face of each pulley or sprocket a flanged apertured disk $i$ and a pawl $k$ within the same. This pawl has shouldered sides which are received in apertures in the opposite walls of the disk $i$ and cover disk $i^2$ which form bearings for the pawl, and the pawl $k$ has a prolongation or lever $k^1$ which extends in a direction opposite to the tooth or point of the pawl through the aperture in the flanged disk and said pawl is also provided with a rib 10. The flanged disk $i$ is formed so as to fit upon one face of a sprocket. Fig. 3 shows one of these flanged disks against each opposite face of the sprocket $e^2$ and one against one face of the sprocket $e^1$. $i^1$ is the flange of this disk $i$ and this flange shows prominently at the lower portion of Fig. 3 where the section is taken through the flange in contradistinction to the aperture showing the pawl and which comes on the opposite side of the said disk. The flange $i^1$ is provided with lugs 11 to which the cover disk $i^2$ is secured. This cover disk is shown plainly in Figs. 3, 11, 16 and 17.

The parts associated in Fig. 5 show, particularly the sprocket $e^2$. In this sprocket as shown plainly in Fig. 10 there is a groove 12 to receive the rib 10 of the pawl. This groove is large enough to permit the rib end of the pawl to swing to the extremes of the engaged and dis-engaged positions of the pawl. This groove 12 together with the rib 10 of the pawl serves also for transmitting power either from the sprocket through the rib and the pawl to the ratchet, or in the opposite direction.

$l$ is the ratchet-wheel located between the disk $i$ and the cover disk $i^2$ surrounding the axle $c$ and connected thereto, and this ratchet is notched at opposite sides so as to pass over the respective ends of a pin 13 which pin passes through the collar $m$ and through the axle $c$. Fig. 3 illustrates a series of these collars and pins and Figs. 13 and 14 show the ratchet and the collar $m$ separately; the pin 13 being longer than the diameter of the collar so that its respective ends may enter the notches in the ratchet so as to communicate the rotation and power of the device either from the pawl to the ratchet and thence through the pin to the axle, or in the opposite direction.

Referring to Fig. 3, I provide a sleeve or collar $n$ around the axle $c$ and fitting within the sprocket $e^1$. This collar at its left hand end fits into an opening in the disk $i$ and at its right hand end fits into an opening in the plate $f^2$ of the frame; said frame as shown in Fig. 8 being provided with a lug 14 entering a notch in the end of this collar $n$. From this it will be apparent that as the frames $f f^1$ and the frame plate $f^2$ are held in a fixed position that therefore the sleeve $n$ connected by the lug 14 received in its end notch $n^1$ must also remain stationary, the sprocket $e^1$ turning around the said sleeve.

Referring to Fig. 3, I have shown a collar $o$ at the left hand end with a bolt for clamping the same to the axle $c$, and $o^1$ $o^2$ are also collars oppositely placed, passing through the sprocket $e^2$ and having their flanged ends received in the oppositely placed disks $i$, and in this figure it will be noticed that the pulley $c^1$ is connected to the shaft by a bolt so it is clamped in position, and that all the operative parts on this shaft $c$ are between the pulley $c^1$ and the collar $o$, and that they are only connected and held in position by the pins 13; the longitudinal position of these parts in a compact relation being effected by the collar $o$ as clamped to the axle and the parts being held between the said pulley and the said collar.

Referring particularly to Fig. 2, I have illustrated two horizontally placed shift bars $r$ $r^1$ connected at one end to manually actuated levers $s$ $s^1$ mounted upon an axle or shaft $t$; these shift bars being provided with bracket members 15 16 in pairs which receive the crank pins $h^2$ of the respective clutch devices.

From Fig. 2 it will be noticed that the pawl $k$ associated with the left hand clutch is not spring actuated, while the pawl $k$ of the right hand clutch device is provided with a spring 17 and while the spring 17 insures the tooth of the pawl being in engagement with the ratchet, the said pawl can be operated and depressed so as to un-latch the pawl from the ratchet by the flange of the disk $h$ over-riding the same as shown in Fig. 5.

Referring to Figs. 1 and 2, the first bar $r$ with its bracketed members is connected to the first pair of cranks $h^1$ and the second bar $r^1$ in a parallel position behind the bar $r$ and connected to the lever $s^1$ is in turn connected to the second pair of cranks which are in the opposite position. The lever $s$ Fig. 2 indicates the clutched position of the devices where the lever $s^1$ is in the un-clutch position.

From Figs. 3 and 4 it will be noticed that the clutch device at the right hand side of the sprocket $e^2$ is reversed in position to the clutch device on the left hand of the sprocket $e^2$, the ratchets $l$ being similarly reversed. The two clutch devices on the left hand side of the sprocket $e^2$ are similarly positioned. Therefore the clutch device on the right hand side of the sprocket $e^2$ is a reversing mechanism effective upon the reversal of the engine driving the power shaft. It will further be noticed that while the flange of the disk $h$ over-rides the pawl lever $k^1$ on the left hand side of the sprocket $e^1$, that it also over-rides the lever of the sprocket on the right hand side $e^2$, and that the first clutch device on the left hand side of the sprocket $e^2$ is free, consequently the pawl is in operative engagement with the ratchet.

The power communicated to the shaft $a$ is transmitted from said shaft through the pin 13 and a ratchet-wheel $l$ to the pawl, from the pawl through its rib and the groove of the sprocket or band-wheel to said sprocket or band-wheel, and therefrom to the sprocket or band-wheel upon the shaft $c$ and from said sprocket or band-wheel on the shaft $c$, through the groove 12, the rib 10 and the pawl to the ratchet-wheel and by the pin 13 to the shaft $c$, and from the shaft $c$ to the pulley $c^1$ or sprocket and through the band or chain $c^2$ to the pulley or sprocket $b^1$ and so to the driven shaft $b$.

In Fig. 18 I have shown a modified form of my invention with reference to the reversing and starting mechanism, in which on the power shaft $a$ there are clutch devices 19 and 21, and between them a gear $t$ and sprocket $v$, both loose upon the shaft and independent; while upon the intermediate shaft $c$ there are clutch devices 18 and 20 and between them a gear $t^1$ and sprocket $v^1$, both loose upon the shaft and either independent of one another or connected together at the pleasure of the user. All the clutch devices 18, 19, 20, 21, are alike and like those hereinbefore described, the details not being shown in Fig. 18. These clutch devices are to be actuated also by cranks, crank pins and shift levers the same as hereinbefore described, and they may be employed instead of the bands and band-wheels of Fig. 2; the shafts $a$ and $c$ being brought nearer together. The sprockets $v$ $v^1$ are connected together by a chain $v^2$. In the operation of this modification the machine can be started with a slow motion by operating the clutches 20 21 and connecting the clutch devices and shafts $a$ $c$ to the sprockets $v$ $v^1$ and chain $v^2$. After starting, these parts can be dis-connected and the mechanism run as desired and as hereinbefore described with reference to Figs. 1 and 2. To reverse the motion and in the case of a motor vehicle, to back the same the clutches 18 and 19 are operated to connect with the shafts $a$ $c$ and meshing gears $t$ $t^1$ so that the direction of rotation of the shaft $a$ will be reversed in the shaft $c$. For this operation it is immaterial whether the gear $t^1$ and sprocket $v^1$ are fastened together, or free of one another.

In reversing the direction of motion as hereinbefore generally described with reference to the clutch device at the right hand side of the sprocket $e^2$ Figs. 3 and 4, by the reversal of the engine in driving the power shaft $a$, I would remark that I do not limit my invention to this manner of reversal for in some instances it may be desirable to continuously revolve the power shaft in the same direction in which event any well known mechanism may be employed, such as meshing gears on the power and intermediate shafts, both the one on the power shaft and the one on the intermediate shaft being loose and engaged by the clutch mechanism when desired.

I claim as my invention:

1. In a changeable speed device and in combination with a shaft, a sprocket thereon and a clutch device, of a frame comprising the concentric parts $f$, a plate face $f^2$, the concentric grooved members $g$ $g^1$ and the end bars extending from said plate face to a place of support.

2. In a changeable speed device, the combination with a shaft, of a sprocket, a disk lying against one face of the sprocket and flanged and apertured, a cover disk for the flanged disk, a pawl mounted between the two disks, a ratchet between the disks mounted on said shaft and adapted to be engaged by the pawl, a rib on one side of the pawl adapted to engage a groove of the sprocket face and means for dis-engaging the pawl from the ratchet at the pleasure of the operator.

3. In a changeable speed device, the combination with a shaft, of a sprocket, a disk lying against one face of the sprocket and flanged and apertured, a cover disk for the flanged disk, a pawl mounted between the two disks, a ratchet between the disks mounted on said shaft and adapted to be engaged by the pawl, a rib on one side of the pawl adapted to engage a groove of the sprocket and devices manually actuated and revoluble outside of the said flanged disk adapted to act upon the pawl to dis-engage the same from the ratchet.

4. In a changeable speed device, the combination with a shaft and a sprocket, of a flanged disk, a cover disk therefor, a ratchet-wheel between said parts secured to the axle, a pawl also within the parts and adapted to engage the ratchet, a connection from the pawl to the sprocket, a support frame adjacent to said ratchet face, spiral grooved cases supported by said frame at opposite sides, a disk member between the said frame parts and the ratchet, having a flange extending over the ratchet face and having lugs received in the grooved cases of the frame, a crank pin connected to this disk member and means for swinging the disk member so that its lugs move through the spiral grooves of the frame to shift the position of this disk member longitudinally of the shaft so as to cause a movement of the flange of the disk member exteriorly and over the ratchet and pawl case so as to cover or un-cover the pawl end and contacting therewith to engage or dis-engage the pawl from the ratchet.

5. In a changeable speed device, the combination with a shaft and a sprocket having a radially disposed groove, of a case formed of a flanged disk with an aperture in the flange and a cover disk in a juxtaposed relation with said sprocket, a ratchet within the case and a pin connecting said ratchet for rotation to the shaft, a pawl within the case having shoulders in apertures of the disks forming the case for a bearing and having a tooth engaging the ratchet and a lever end adapted to pass through the aperture in the case and beyond the periphery thereof when the pawl is in engagement with the ratchet and said pawl having a rib on one side received in the groove of the sprocket, whereby the rotation of the sprocket is transferred through the groove and the rib of the pawl and through the pawl to the ratchet and to the shaft, or in the opposite direction, and means for swinging the pawl by contacting with its projecting end so as to remove the point of the pawl from the teeth of the ratchet.

6. In a changeable speed device, the combination with a shaft and a sprocket having a radially disposed groove, of a case formed of a flanged disk with an aperture in the flange and a cover disk in a juxtaposed relation with said sprocket, a ratchet within the case and a pin connecting said ratchet for rotation to the shaft, a pawl within the case having shoulders in apertures of the disks forming the case for a bearing, and having a tooth engaging the ratchet and a lever end adapted to pass through the aperture in the case and beyond the periphery thereof when the pawl is in engagement with the ratchet and said pawl having a rib on one side received in the groove of the sprocket, whereby the rotation of the sprocket is transferred through the groove and the rib of the pawl and through the pawl to the ratchet and to the shaft, or in the opposite direction, a flanged disk member loose on said shaft with a flange of greater diameter than the case of the pawl and ratchet so as to snugly fit over the same, a crank and crank pin connected with the flanged disk member for swinging the same and means for manually actuating the same for imparting to said member a movement longitudinally of the shaft so as to cause said flange to override the projecting lever end of the pawl and depress the same so as to dis-engage the pawl from the ratchet-wheel.

7. In a changeable speed device the combination with a shaft, of a frame device comprising the concentric portions $f$, an apertured frame plate $f^2$ formed therewith and having a lug 14, a sleeve surrounding the shaft and having a notch receiving the aforesaid lug, whereby the lug is held in position by the frame device, a sprocket surrounding and revoluble upon the said sleeve and coming up against one face of said frame; and a clutch device for effecting an engagement between the sprocket and shaft for the transmission of motion.

8. In a changeable speed device, the combination with a shaft, of a frame device comprising the concentric portions $f$, an apertured frame plate $f^2$ formed therewith and having a lug 14, a sleeve surrounding the shaft and having a notch receiving the aforesaid lug, whereby the sleeve is held in position by the frame device, a sprocket surrounding and revoluble upon the said sleeve and coming up against one face of said frame, spiral grooved cases $g$ $g^1$ secured to or formed as parts of said frame, a disk member $h$, flanged lugs 8 9 upon opposite sides of said disk member $h$, a crank $h^1$ and crank pin $h^2$, a case having an aperture in the periphery thereof, a pawl and ratchet-wheel within said case, the pawl having a lever end projecting through the aperture in the case and adapted to be engaged by the flange of the member $h$ and means for connecting the pawl to the sprocket and the ratchet wheel to the shaft and manually actuated devices for swinging the disk member $h$ by its crank and crank pin.

Signed by me this 6th day of May 1907.

J. A. WILKIN.

Witnesses:
GEO. T. PINCKNEY,
HAROLD SERRELL.